United States Patent Office 3,239,477
Patented Mar. 8, 1966

3,239,477
ADHESIVE COMPOSITIONS COMPRISING
ACRYLIC ESTERS AND DRYING OILS
Wolf Karo, Huntington Valley, Pa., assignor to The
Borden Company, New York, N.Y., a corporation of
New Jersey
No Drawing. Filed June 29, 1961, Ser. No. 125,624
7 Claims. (Cl. 260—23.5)

This invention relates to an acrylate ester and drying oil composition and the method of making it.

The invention is particularly useful in making an adhesive for bonding nuts on bolts or for other metal surfaces and will be illustrated by description in connection therewith.

The use of tetraethylene glycol dimethacrylate, for example, in combination with certain organic peroxide initiators of polymerization has been described. A disadvantage arises in that the bonded nut in many cases cannot be removed from the bolt without breaking metal. Furthermore the adhesive does not cure at a satisfactory rate when exposed to the air, as at the edge of the nut; as a result the curing cannot be followed visually and can be tested only by trying at intervals to unscrew the nut from the bolt.

The present invention provides an adhesive which gives the desired permanent holding of the nut in position, gives visible evidence as to when the adhesive is cured and also makes possible removal of the nut by torque less than that which, if applied, would occasionally cause fracture of the bolt or nut.

Briefly stated the invention comprises the herein described process and product and more particularly an interpolymer of a polyglycol acrylate or methacrylate with a fatty glyceride drying oil. In one embodiment the invention comprises an interpolymer of the said acrylate ester, the fatty glyceride oil, and styrene. In a modification, the invention comprises a mixture of the said interpolymer of the acrylate and drying oil with added polymeric resinous material that is soluble in the said interpolymer and also in the monomeric acrylate ester used as a starting material, examples of such admixed resinous material being polystyrene, polymethyl methacrylate, styrene-maleic acid (or anhydride)copolymer, polydiallyl phthalate, copolymers of ethyl or methyl acrylates or methacrylates with acrylonitrile, the copolymer being of a syrupy consistency at ordinary temperatures, like polymers of ethenoid monomers of the solubility stated and chlorinated rubber (Perlon).

As to materials, the ester used as the principal component is the di or other polyester of an acrylic acid, e.g., methacrylic or acrylic acid, with a water soluble glycol. Examples of the glycols to be used are neopentyl glycol, tetraethylene glycol, triethylene glycol, ethylene glycol, diethylene glycol and the propylene and butylene homologs thereof. The number of carbon atoms in these glycols is within the range 2–8.

The drying oils that are used are those which are relatively high in content of linoleic, linolenic or like ethenoid acids, such as those oils of iodine number above 125 and suitably 160–210 or higher, as for example, perilla, oiticica, linseed, tung, and soybean. The oil selected may be in refined condition but refining is not necessary for all purposes.

The peroxide compound used is organic and is soluble in the monomeric materials to be interpolymerized.

As the inhibitor to prevent premature polymerization or excessively rapid final cure or polymerization, there is used any one or more of the following: hydroquinone, pyrogallol, quinhydrone, monoethyl, monophenyl or tertiary-butyl ether of hydroquinone.

The peroxide initiators selected are those that are usual for ethenoid bond polymerization, as for example, ditertiary-butyl peroxide, tertiary-butyl hydroperoxide, cumene hydroperoxide, diisopropylbenzene hydroperoxide, pinene hydroperoxide, p-methane hydroperoxide, methyl ethyl ketone peroxide, benzoyl peroxide, and lauroyl peroxide. These peroxides are effective at low temperature, such as room, in curing the glycol acrylate resins in contact with iron or like metal.

The following table shows proportions of materials to be used.

| Component | Parts by Weight | |
|---|---|---|
| | Permissible | For Best Results |
| Glycol acrylate ester | 100 | 100 |
| Drying oil | 1.5–25 | 2–20 |
| Polymeric resin, e.g., polystyrene | 0–25 | 2–20 |
| Inhibitor of polymerization | 0.002–0.1 | 0.005–0.05 |
| Peroxide initiator of polymerization | 0.1–20 | 0.5–10 |

Within the range of proportions given, selections made depend upon the exact effect or amount of effect needed in the adhesive for a given purpose. Thus the larger the proportion of the fatty glyceride introduced, the greater is the decrease in hardness of the bond of the nut to the bolt or like union. The same general rule applies to the amount of the polystyrene or like resinous material admixed with the interpolymer.

As to conditions of operation, suitably the inhibitor is mixed into the drying oil and the glycol acrylate ester and the polystyrene or the like if any then admixed warm as at 60° C. Then the mixture is cooled and the initiator is introduced with stirring.

In making the intermediate polymeric materials, i.e., the said interpolymer, the peroxide compound used in initiating the polymerization is preferably the peroxide that is to be used also in the final mixed adhesive composition for causing curing after the application between surfaces to be adhered.

The polymerization reaction is ordinarily effected at only moderately elevated temperatures, around 80° C. or so.

The finished adhesive composition in use is applied to a surface such as bolt threads in any convenient manner, examples being dipping, spraying or brushing on. The nut or part to be joined is then screwed on or otherwise assembled and the whole allowed to stand. We find that the adhesive cures or sets not only inside the nut in contact with the metal surfaces but also sets in the edge portions where there is some contact with air and this setting or curing in the edge portions is a convenient indication of the setting.

In an alternative use, the adhesive mixture, which is generally syrupy particularly when the polystyrene or like polymeric material is present therein, is applied over an end of a pipe which is to be fitted and normally soldered or welded to the end of a slightly larger pipe. When the pipes are assembled with the adhesive between the ends to be joined, the adhesive will set in a reasonable time and give a joint so firm as to be a satisfactory replacement for welding or soldering.

The following table shows examples of the invention as proportions of the several types of materials introduced and records the approximate break-out torque expressed as inch-pounds required for separation, the test being made on a ¼ inch bolt with a pitch of 20 threads to the inch and a fitting nut of steel. Here the curing agent was 5% of the peroxide initiator on the combined weight of the ester, refined raw linseed oil and polymeric resinous material, if any, the initiator being 90% by weight of diisopropyl benzene hydroperoxide and 10% of methyl ethyl ketone peroxide, and the adhesive being left on the nut and bolt assembly for 24 hours at 72° F. at 50% relative humidity before the break-out torque was determined. Composition A is not a part of the invention and is included for contrast in break-out torque. The proportions are expressed as parts by weight here and elsewhere herein except where specifically stated to the contrary.

The results follow:

TABLE 1
Examples 1–12

| Example No. | Tetraethylene Glycol Dimethacrylate, percent | Polystyrene, percent | Linseed Oil, percent | Break-Out Torque, inch-lbs. |
|---|---|---|---|---|
| A | 100 | 0 | 0 | 38 |
| 1 | 95 | 5 | 0 | 29 |
| 2 | 90 | 10 | 0 | 18 |
| 3 | 85 | 15 | 0 | 23 |
| 4 | 80 | 20 | 0 | 23 |
| 5 | 95 | 0 | 5 | 28 |
| 6 | 90 | 0 | 10 | 13 |
| 7 | 93 | 3.5 | 3.5 | 21 |
| 8 | 90.5 | 4.75 | 4.75 | 9 |
| 9 | 82 | 9 | 9 | 8 |
| 10 | 80 | 10 | 10 | 5 |
| 11 | 76 | 12 | 12 | 5 |
| 12 | 66.6 | 16.7 | 16.7 | 1 |

Showing that small amounts of the additives may cause the undesired effect of actually increasing the breakout torque it has been found that 1 part of the polystyrene and 1 part of linseed oil with 98 parts of the tetraethylene glycol dimethylacrylate actually increases the break-out torque to 53 pounds. Such small proportions may be used when there is need for even a stronger bond than obtained with the tetraethylene glycol dimethylacrylate alone as the base for the adhesive.

While the adhesive tests reported in the Examples 1–12 were made with iron, similar results qualitatively were obtained with copper and other polyvalent metal. With the metals such as zinc, cadmium, tin, there is no need of the modifying agent to control the break out torque as the bond is not sufficient in any event to cause rupture of the bolts or nuts in attempts to disassemble the adhesively bonded bolt and nut.

The procedure and composition of any of the Examples 1–4 and 7–12 are followed except that the polystyrene used is replaced in turn by an equal weight of each of the said polymeric resinous materials listed earlier herein.

Example 13

The procedure and composition of Example 12 are used except that the refined raw (i.e., not boiled or blown) linseed oil is replaced in that example by an equal weight of each of the other fatty glyceride drying oils disclosed, used separately and in turn.

Example 14

The procedure and composition of Example 12 are used except that the dimethacrylate there used is replaced by any of the other glycol methacrylates or acrylates shown herein, used separately, in turn and in equal proportion by weight.

While the results obtained in these Examples 13 and 14 would not give the identical break-out torques shown in the table for Examples 1–12, the drying oil will lower the break-out torque when the oil used in the amount of 3.5–25 parts for 100 parts of the glycol dimethylacrylate or acrylate ester.

Once the results have been obtained, various explanations may be advanced to explain the cause. It is considered that the fatty glyceride drying oil and the selected glycol methacrylate or acrylate interpolymerize through the opening of the ethenoid bonds in each. It is not necessary that a large proportion of the drying oil react in this way, a small amount of such modification of the acrylate ester being adequate to give the desired modification of the strength of the bond and also the property of the combination to cure in contact with some air as at the edges of the nut in position over the adhesive on the threaded bolt.

It will be understood that it is intended to cover all changes and modifications of the examples of the invention herein chosen for the purpose of illustration which do not constitute departures from the spirit and scope of the invention.

I claim:

1. The adhesive composition of claim 6, the said ester being tetraethylene glycol dimethacrylate.

2. The adhesive composition of claim 6, the said ester being neopentyl glycol diacrylate.

3. The adhesive composition of claim 6, the said drying oil being linseed oil.

4. The adhesive composition of claim 6, the said ester being neopentyl glycol dimethacrylate.

5. An adhesive composition comprising tetraethylene glycol dimethacrylate, a fatty glyceride drying oil of iodine number within the range 160–210, polystyrene, hydroquinone as an inhibitor of polymerization, and diisopropylbenzene hydroperoxide as an initiator of polymerization, the said methacrylate and the drying oil being in part interpolymerized and the proportions being about 3.5–25 parts by weight of the drying oil and 2–25 parts of the polystyrene for 100 parts of the said ester.

6. An adhesive composition comprising a mixture of about 100 parts by weight of an ester of an acid selected from the group consisting of acrylic and methacrylic acids with a glycol containing 2–8 carbon atoms to the molecule in the proportion of 2 moles of said acid to one mole of the glycol, 1.5–25 parts of a fatty glyceride drying oil of iodine number at least 160, 2–20 parts of a polymeric resinous material selected from the group consisting of polystyrene, polymethylmethacrylate, styrene-maleic acid copolymer, polydiallyl phthalate, chlorinated rubber and copolymers of acrylonitrile with a monomer selected from the group consisting of methyl and ethyl acrylates and methacrylates, an inhibitor of ethenoid bond polymerization of ethenoid monomers, and an organic peroxide initiator of said polymerization.

7. The adhesive composition of claim 6, said fatty glyceride drying oil being linseed oil, said inhibitor being hydroquinone in the amount of about 0.005–0.05 part, and said initiator being a mixture of 90% diisopropyl benzene hydroperoxide and 10% of methyl ethyl ketone peroxide in the amount of about 5% of the total weight of said polymeric resinous material and drying oil.

References Cited by the Examiner
UNITED STATES PATENTS

| | | | |
|---|---|---|---|
| 2,129,694 | 9/1938 | Jzard | 260—89.5 |
| 2,129,722 | 9/1938 | Woodhouse | 260—89.5 |
| 2,160,532 | 5/1939 | Barrett et al. | 260—89.5 |
| 3,041,322 | 6/1962 | Krieble | 260—23.5 |

LEON J. BERCOVITZ, *Primary Examiner.*

MILTON STERMAN, *Examiner.*